Patented June 4, 1935

2,003,564

UNITED STATES PATENT OFFICE 2,003,564

GRAPHITE LUBRICANT

William Cowling Thorpe, Toronto, Ontario, Canada, assignor to Robert Elroy Wark, Toronto, Canada, as trustee No Drawing. Application June 2, 1932, Serial No. 615,037

3 Claims. (Cl. 87—9)

This invention relates to graphite lubricants, and my object is to produce a lubricant in which the graphite is in perfect stable suspension and will not separate out by standing or excessive heat.

Graphite has long been recognized as a most efficient and lasting lubricant, but it has not come into general use because heretofore no medium has been found which will retain the graphite in suspension, with the result that the graphite would settle at the bottom after the lubricant had been standing for some time and would require shaking or mixing before being used. Sometimes special mixing mechanism was necessary for this purpose. More serious still was the fact that when the lubricant was applied to the machinery the graphite would not be equally distributed over the parts to be lubricated with the result that too much graphite would accumulate in some parts and other parts would not be lubricated at all. In oil cups or machine casings the graphite would separate out from the liquid, usually petroleum oil or grease, with which it was mixed and form a sediment at the bottom which never touched the moving parts and clogged up the passageway thereto. This was accentuated by the evaporation of the liquid under heat.

I have overcome these objections to graphite lubricants by producing a lubricant which is a homogeneous mixture from which the graphite will not separate out, and I have achieved that result by mixing powdered graphite with an emulsion of purified degras, water and other ingredients by a process which is hereinafter more specifically described.

I use commercial degras as a binder or base for the lubricant. Degras is an animal fat taken from wool or hides and is heat resisting to a high degree. Commercial degras is available in large quantities at a low price.

In making a liquid lubricant the degras must be first purified or deodorized. Any known process may be used, but I have found the following method most satisfactory:

Place 20 lbs. of degras into 6 gallons of cold water. Smelt at a temperature of 120° F. to 150° F. until completely melted. Stir thoroughly and add 1 lb. Epsom salts (magnesium sulphate) stirring thoroughly. Then add 4 oz. permanganate of potash (potassium permanganate). Mix all the ingredients and allow to cool, after which place on a mesh screen and allow water to drain off. This process removes the fatty acids and the purified degras, sometimes known as lanolin has the property of taking up large quantities of water, and forming emulsions which are very hard to separate into their constituents.

This process produces about 20 lbs. purified degras which is ordinarily a hard solid fat. It is heated to about 125° F. at which temperature it is liquefiable, and placed in a power mixer containing cutters. The degras is cut or thinned out by the addition of 2 gallons of kerosene and thoroughly mixed. 7½ gallons of water are then added. This is mixed with and absorbed by the degras forming a stable emulsion. In this emulsion is added successively 1 gallon of turpentine and ½ gallon of commercial aqueous solution of ammonia. Finally 30 lbs. of powdered graphite containing 92.5 carbonic element is added and thoroughly mixed in the emulsion so that it is uniformly distributed throughout.

The lubricant may be thinned to the desired consistency by the addition of kerosene. Kerosene in addition to being a cutter or thinner lowers the freezing point of the water in the lubricant reducing the possibility of freezing in cold weather.

The turpentine and ammonia not only tend to make the emulsion homogeneous but are evaporators or driers which cause the liquid in the lubricant to evaporate under friction. This lubricant is in action essentially a dry lubricant. The liquid in the lubricant serves chiefly to suspend the graphite and carry it to the surface to be lubricated. There is substantially no evaporation of the turpentine or ammonia under ordinary conditions or even when subjected to great heat. However, under the friction of the moving parts these ingredients not only evaporate but cause the water and kerosene, and to a certain extent the purified degras, to evaporate leaving a thin film of graphite. I have found that the mixture of turpentine and ammonia in the proportions given above impart to the lubricant just the correct degree of evaporability to accomplish the desired result.

If a solid lubricant or grease is desired the crude or unpurified degras may be used.

An excellent gun grease may be made by the following formula and process:

Two lbs. crude degras is heated to 120° F. and melted. It is then cooled to blood heat and 1 oz. of caustic soda is added. The mixture is diluted by 1 pint of cold water and stirred until brought to a semi-saponification. ½ lb. powdered graphite 92.5 carbonic content is then added and mixed thoroughly. The consistency may be varied by varying the amount of caustic soda.

The quantities of the various ingredients mentioned are, of course, merely illustrative. The proportions are those which I have found to be most satisfactory.

The proportions by weight of the quantities of liquid lubricant mentioned are as follows:

| | |
|---|---|
| Purified degras | 20 |
| Kerosene | 16 |
| Water | 75 |
| Turpentine | 8.7 |
| Aqueous solution of ammonia | 4.4 |
| Graphite | 30 |

What I claim as my invention is:

1. A liquid lubricant comprising in combination the following ingredients in substantially the following proportionate parts by weight: an emulsion of 20 parts degras from which the fatty acids have been removed, 16 parts kerosene, 75 parts water, 8.7 parts turpentine, and 4.4 parts aqueous solution of ammonia, with 30 parts graphite in suspension in said emulsion.

2. A liquid lubricant comprising in combination the following ingredients in substantially the following proportionate parts by weight: an emulsion of 20 parts degras from which the fatty acids have been removed, 16 parts kerosene, 75 parts water, 13.1 parts of a mixture of turpentine and ammonia with 30 parts graphite in suspension in said emulsion.

3. A liquid lubricant comprising the ingredients set forth in claim 2, which has been thinned or diluted by addition of kerosene.

WILLIAM COWLING THORPE.